No. 659,299. Patented Oct. 9, 1900.
D. GRUPE.
ROTARY DRIER.
(Application filed Aug. 7, 1899.)
(No Model.) 2 Sheets—Sheet 1.
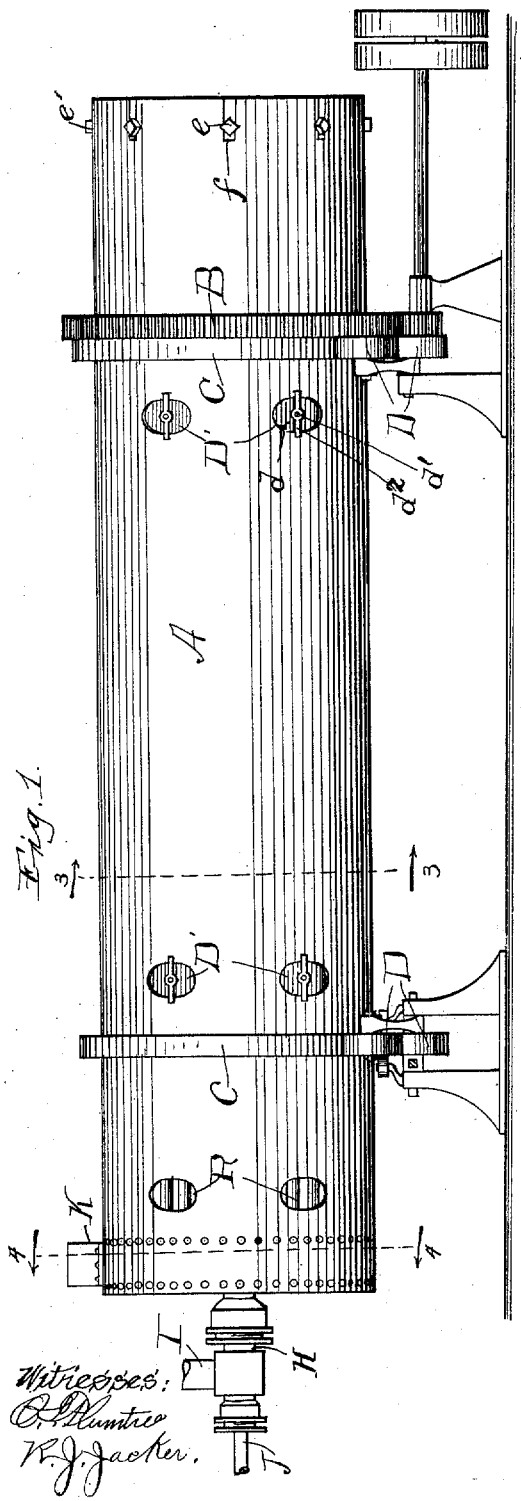
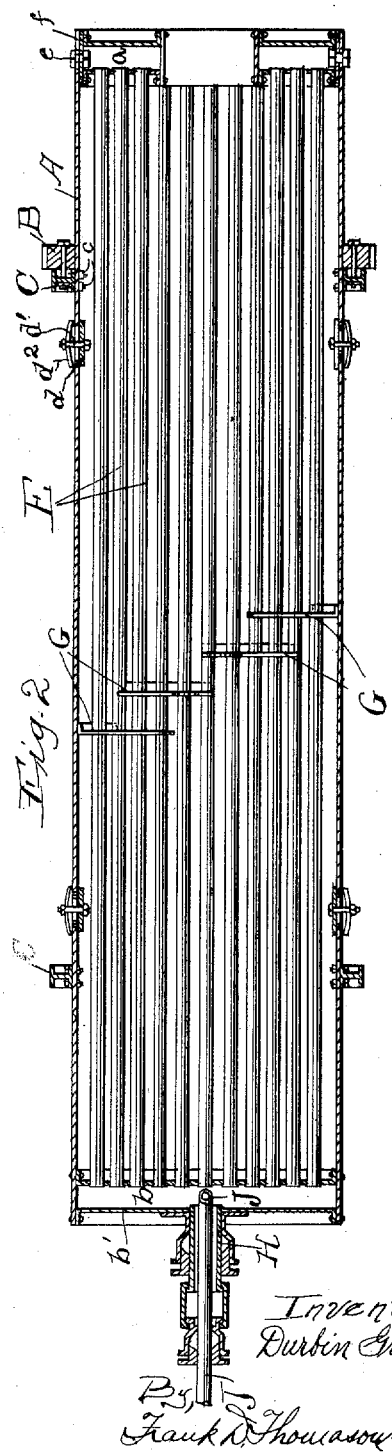
Inventor
Durbin Grupe

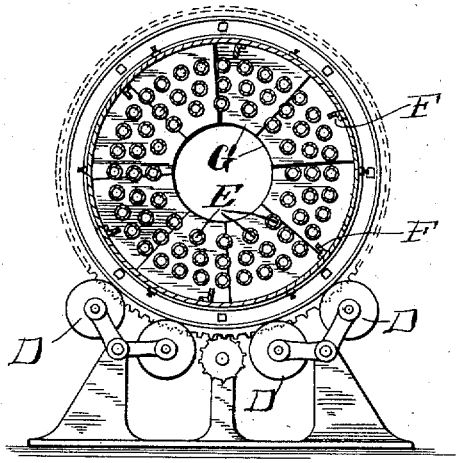
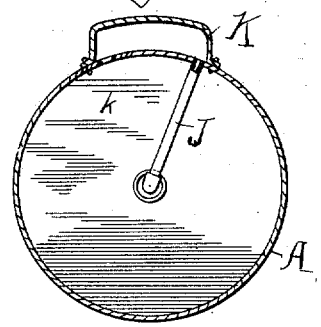
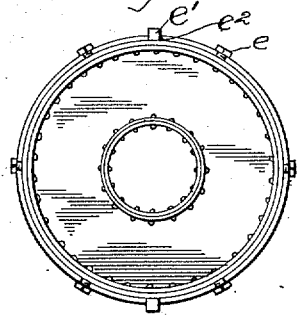
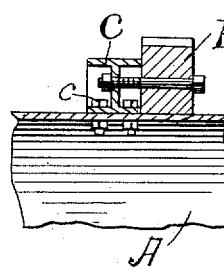
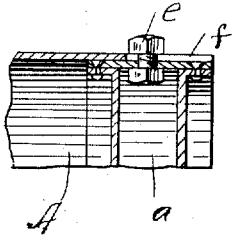

UNITED STATES PATENT OFFICE.

DURBIN GRUPE, OF DAVENPORT, IOWA.

ROTARY DRIER.

SPECIFICATION forming part of Letters Patent No. 659,299, dated October 9, 1900.

Application filed August 7, 1899. Serial No. 726,389. (No model.)

*To all whom it may concern:*

Be it known that I, DURBIN GRUPE, a citizen of the United States, and a resident of Davenport, in the county of Scott and State of Iowa, have invented certain new and useful Improvements in Rotary Driers, of which the following is a full, clear, and exact specification, reference being had to the accompanying drawings.
My invention relates to that class of rotary driers which are extensively employed in breweries and glucose factories particularly to dry either the raw or spent materials used or produced in such institutions. These driers consist principally of a long cylinder traversed longitudinally by steam-flues, into which cylinder the material to be dried is fed at one end and is discharged from the opposite end. Heretofore considerable difficulty has been experienced in maintaining the operative condition of these driers, because, first, of the liability of the connections at the ends of the flues working loose and leaking and causing the same to sag; second, because of their buckling when expanded by the heat; third, because of the difficulty of tightening up the means of connection of the bearing-ring to said cylinder in view of the arrangement of numerous flues therein, and, fourth, because of the accumulation of moisture in the steam system of the cylinder. The object of my invention is to avoid these difficulties by furnishing a support for said flues between the ends thereof which will not interfere with the progress of the material in process of drying toward the discharge end of the cylinder, by giving one of the heads of the cylinder a limited longitudinal adjustment sufficient to compensate for the expansion of the flues, by providing a series of circumferentially-arranged hand-hole openings through which access can be had to the means employed for securing the bearing-rings to the cylinder, and by the employment of a suitable drain-trap and radially-disposed discharge-pipe in connection therewith.

In the drawings, Figure 1 is a side view of my invention. Fig. 2 is a longitudinal central section thereof. Fig. 3 is a transverse vertical section taken on line 3 3 of Fig. 1, looking in the direction of the arrow. Fig. 4 is a transverse vertical section taken on dotted line 4 4, Fig. 1. Fig. 5 is a view of the feed end of the cylinder. Fig. 6 is a detail view showing the annular gear, the ring to which it is attached, and adjacent portion of the circular shell in section; and Fig. 7 is a detail view showing the method employed of securing the chamber $a$ to the cylinder-casing.

In the drawings, A represents the cylindrical shell of a rotary drier, which is revolved by means of suitable drive-gearing engaging an annular gear B, that is preferably secured to the bearing-ring C, secured to and surrounding said cylinder near the receiving end thereof. There are two of these bearing-rings C, one located near one end of the cylinder and the other near the other end. These rings rest and travel on a transversely-arranged nest of idle rollers D, that are suitably situated for this purpose near the ends of the machine, as shown. I make no claim to inventorship of this method of revolving the cylinder. The strain on these rings is very great and the bolts and nuts securing the same to the shell of said cylinder work loose and unless properly tightened cause considerable injury. These rings are I shape in cross-section, and the bolts $c$, securing the same to the cylinder, pass through the inner flanges, as shown in Fig. 6. Heretofore in order to tighten these bolts it was necessary for a man to crawl inside of the cylinder, and in order to get at the same it was necessary to work between the flues with tongs in a laborious and inconvenient manner. I avoid this difficulty by providing the shell with a transversely-arranged series of hand-openings D', which are normally closed by plates $d$, which are held in place by the nuts and bolts $d'$. The outer ends of these bolts $d'$ extend out through a cross-bar $d^2$, spanning the hand-holes, so that said holes can be easily opened and a workman can thrust his arm through any one of them and reach the bolt desired.

Placed longitudinally in the cylinder in such manner as to leave a central area unoccupied by the same are several flues E, the ends of which are secured in any suitable manner in the end chambers $a$ and $b$ of the cylinder. The chamber $b$ is immovably secured in place at the discharge end of said cylinder; but chamber $a$ is permitted a limited automatic adjustability in the direction of length of said flues, so as to accommodate the expansion and contraction of the same. This chamber $a$ consists of two corresponding circular head-plates of such diameter as to fit snugly within the adjacent end of the cylinder and are provided with large central openings. The flanged edges of both the outer circumference and the central openings of these plates are connected by rim-plates, which maintain the distance between the said circular plates and complete the steam-chamber within the same, into which said steam-flues, which are expanded or otherwise suitably connected only to the inner head-plate, discharge. The circumference of this chamber $a$ is not permanently fastened to the cylinder, but has a series of bolts $e$ projecting radially outward through longitudinal slots $ff$ in the surrounding shell near the end edges thereof, which are tightened just sufficient to hold said chamber $a$ securely in place, and at the same time permit the expansion of the flues when heated without danger of their ends working loose from the heads in which they are secured and leaking.

In order to prevent any torsional strain on bolts $e$, I prefer to secure to the outer circumference of chamber $a$, by riveting or otherwise, one or more guide-blocks $e'$, which latter enter slots $e^2$ in the end edge of the cylinder, about as shown.

The great length and the frequent expansion and contraction of flues E causes them to sag, and should they come in contact considerable noise would be created during the revolution of the cylinder and the material being dried could fall between the same easily. This I avoid by a series of corresponding segmental plates G G, which are arranged in spiral order and have their outer ends flanged and secured to the shell of the cylinder. These segmental plates have a series of holes in them corresponding in number to the flues E occupying the same transverse area, and are preferably of such dimensions that their radially-disposed edges have semicircular or other shaped recesses in them corresponding to part of the circumference of the flues seated therein, which latter are thus supported by nesting in the edges of two of said plates. This fact demonstrates the order in which said plates G are placed with reference to the radial plane which each occupies—that is to say, the edges of one of said plates will come in the same longitudinal plane with one of the side edges of the plate in front of it and the opposite side edge of the plate back of it. It will of course be understood that while I prefer this arrangement of said segmental plates it can be altered. The open order in which these segmental plates G are placed does not interfere at all with the progress of the material from the feed end of the cylinder toward the discharge end thereof, and the means employed by me to insure this movement of the stuff in process of drying is the same that is now in use—to wit, the slight dip or downward inclination of the cylinder toward its discharge end, and the employment of longitudinally-disposed ribs F, which extend from head to head of the machine, being simply divided where intersected by said segmental supporting-plates. When the dried material reaches the lower closed end of the cylinder, it discharges through the openings R R. The steam-chamber of the cylinder is made of two head-plates flanged and riveted to the cylinder-shell at such distance apart as to leave a space between them in which the steam can freely circulate. The outer of these plates $b'$ has a suitably-packed steam-pipe H connected to its center in such manner that the steam-supply therefrom into said head is not interfered with in the least by the revolution of the cylinder. The outer end of this pipe H is suitably connected to a depending steam-pipe I. This arrangement permits the insertion of a longitudinal drain-pipe J through the end of pipe H, which is packed by a suitable gland-nut $h$, so as to permit said drain-pipe to revolve therein. At a point just within said chamber $b$ pipe J is bent radially outward to and through the shell into the drain-trap K. This trap consists of a suitable metal box, which is secured to the cylinder in the same transverse plane as chamber $b$ and is elongated circumferentially and communicates with said chamber through a suitable opening at one end and has said drain-pipe J connected to it at the other. The drain-pipe takes from the end of the trap, which during the revolution of the cylinder comes last. Thus as the cylinder revolves the condensation in the flues and heads drains into the trap and the trap when it is carried to a point above the horizontal plane of the center discharges into the drain-pipe J, through which the drainage is conveyed away.

What I claim as new is—

1. The combination in a rotary drier, of a revoluble cylinder and steam-chambers in the ends thereof, of flues having their ends secured in said chambers and independent supporting-plates therefor located at suitable distances apart and in spiral progression intermediate said chambers.

2. The combination in a rotary drier of a revoluble cylinder, a non-adjustable steam-chamber secured in one end thereof, and an adjustable steam-chamber located in the opposite end of the same, of flues having their ends secured in said chambers and independent supporting-plates therefor located at suitable distances apart and in spiral progression intermediate said heads.

3. The combination in a rotary drier of a revoluble cylinder having longitudinal slots at one end thereof, a non-adjustable steam-chamber secured in the opposite end, an adjustable steam-chamber located in the end of the same contiguous to said slots and radial bolts, of flues having their ends secured in said chambers and independent supporting-plates therefor located at suitable distances apart and in spiral progression intermediate said chambers.

4. The combination in a rotary drier with a revoluble cylinder, and steam-chambers secured in the ends of the same, of flues connecting said chambers and corresponding independent supporting-plates therefor located at equal distance apart in spiral progression intermediate said chambers the total surface area of which corresponds to the area in a given transverse plane through said cylinder occupied by said flues.

DURBIN GRUPE.

Witnesses:
 ADOLPH WAHLE,
 CHARLES F. WINTERS.